US006502621B2

(12) United States Patent
Sonnenberg et al.

(10) Patent No.: US 6,502,621 B2
(45) Date of Patent: *Jan. 7, 2003

(54) PROCESSES FOR FORMING STYRENE/METHYL METHACRYLATE COPOLYMERS

(75) Inventors: Fred Sonnenberg, Fort Worth, TX (US); Vesselin Danailov Miladinov, Fort Worth, TX (US)

(73) Assignee: StyroChem Delaware, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/139,529

(22) Filed: May 6, 2002

(65) Prior Publication Data

US 2002/0124983 A1 Sep. 12, 2002

Related U.S. Application Data

(63) Continuation-in-part of application No. 10/054,258, filed on Jan. 22, 2002, which is a continuation of application No. 09/828,408, filed on Apr. 6, 2001, now Pat. No. 6,360,807, which is a continuation-in-part of application No. 09/473,606, filed on Dec. 29, 1999, now abandoned.

(51) Int. Cl.$^7$ .............................. B22C 9/02; C08J 9/18; C08J 9/20
(52) U.S. Cl. ........................... 164/34; 164/246; 521/56; 521/59; 521/60; 526/201
(58) Field of Search .............................. 521/56, 59, 60; 164/34, 246; 526/201

(56) References Cited

U.S. PATENT DOCUMENTS

| | | | |
|---|---|---|---|
| 2,673,194 A | | 3/1954 | Grien |
| 3,932,986 A | | 1/1976 | Kosaka et al. |
| 4,085,169 A | | 4/1978 | Saito et al. |
| 4,091,054 A | | 5/1978 | Saito et al. |
| 4,169,193 A | | 9/1979 | Biglione et al. |
| 4,169,828 A | | 10/1979 | Wright |
| 4,183,993 A | | 1/1980 | Benstead et al. |
| 4,333,969 A | | 6/1982 | Wright et al. |
| 4,581,275 A | | 4/1986 | Endo et al. |
| 5,147,937 A | | 9/1992 | Frazza et al. |
| 5,403,866 A | | 4/1995 | Kato et al. |
| 5,935,645 A | | 8/1999 | Anfuso et al. |
| 6,360,807 B2 | * | 3/2002 | Sonnenenberg et al. |

* cited by examiner

Primary Examiner—Morton Foelak
(74) Attorney, Agent, or Firm—Duane Morris LLP

(57) ABSTRACT

Copolymers are formed by suspension polymerization of monomers, including one or more styrenic monomers, and methyl methacrylate. The polymerization can be carried out in the presence of one or more blowing agents, producing polymers that can be expanded. The methods are useful, for example, in forming expandable polymeric particles. The expandable polymer particles are useful in processes such as forming patterns for lost foam molding techniques.

5 Claims, No Drawings

PROCESSES FOR FORMING STYRENE/METHYL METHACRYLATE COPOLYMERS

REFERENCE TO RELATED APPLICATION

This application is a continuation-in-part of U.S. patent application Ser. No. 10/054,258, filed Jan. 22, 2002, which is a continuation of U.S. patent aplication Ser. No. 09/828,408, filed Apr. 6, 2001, now U.S. Pat. No. 6,360,807, which is a continuation-in-part of U.S. patent application Ser. No. 09/473,606, filed Dec. 29, 1999, now abandoned.

FIELD OF THE INVENTION

The present invention is directed to processes for forming beads of polystyrene methyl methacrylate.

BACKGROUND OF THE INVENTION

Styrenic polymers have a wide variety of applications, including the formation of expanded polystyrene which can be used to make a variety of products. Processes for forming styrenic polymers include emulsion polymerization, suspension polymerization, and the use of particular suspensions or emulsion aids.

Polymer particles are useful in applications such as the formation of expanded resins, for example, expanded polystyrene. Expanded polystyrene and other expanded resins can be prepared from expandable polymeric particles made by contacting the polymeric particles with a volatile compound known as a "blowing agent" or "expanding agent". Such agents include aliphatic hydrocarbons such as butane, pentanes, hexanes, and halogenated hydrocarbons such as trichloromethane, trichlorofluoromethane, and dichloromethane. The particles in contact with the expanding agent may be expanded by heating, or by exposure to reduced pressure as in a vacuum. The size and size distribution of the expanded particles will depend upon the size and size distribution of the expandable particles.

Expanded and expandable polymeric resins have applications in packaging, consumer products, and in materials processing. Examples of materials processing applications for expanded polymeric resins include so-called "lost foam casting", also called "evaporative pattern casting". In lost foam casting, molten metal is poured into a pattern made of expanded polymeric material, i.e. a foam, coated with a refractory material surrounded and supported by unbounded sand. The foam is decomposed by the heat of the molten metal and replaced by the metal.

However, parts cast of metals such as iron, using expanded polystyrene foams, may have an unacceptable amount of surface defects, such as lustrous carbon. Expandable resin compositions made of styrene-acrylic copolymers are described in U.S. Pat. No. 5,403,866.

Polymers such as polystyrene are frequently manufactured by water suspension. Some of the advantages of using water suspension are good temperature control, production of polymer with desired particle size, ease of discharging from the reactor, less expensive reactors, etc. Due to the development of the lost foam market, a need for the production of polystyrene methyl methacrylate copolymer arises.

Copolymer production poses several challenges as compared to the polystyrene production. Polystyrene suspension based on tricalcium phosphate (TCP) and potassium persulfate count on slight styrene water solubility. The styrene in the water phase reacts with the potassium persulfate and forms a surfactant. This surfactant is needed in maintaining the suspension stability. The production of the copolymer calls for a mixture of styrene and methyl methacrylate monomers. The methyl methacrylate is more polar, and thus a more hydrophilic compound. Therefore, the methyl methacrylate concentration in the water phase will be higher than the styrene concentration; more methyl methacrylate than styrene will be available to react with initiators such as potassium persulfate. The resulting surfactant will have a chain of predominantly methyl methacrylate. If the surfactant has a fairly low molecular weight, it will be water soluble and it may not be sufficient to lower the surface tension to the extent to provide a stable suspension. On the other hand, surfactants such as sodium alkyl benzene sulfonate have a long aliphatic hydrophobic chain that may not interact with the more hydrophilic surface of the beads. A balanced mixture of potassium persulfate and sodium alkyl benzene sulfonate can provide a detergent mixture that better matches the copolymer's surface polarity.

The viscosity of the organic phase copolymers increases relatively slowly in the beginning, followed by a rapid increase in the viscosity. The rapid increase in the viscosity is accompanied by a well pronounced exothermic reaction. The exotherm is more pronounced when the temperature of the reaction is higher.

When polystyrene is polymerized by itself, the increase of the organic phase viscosity is more gradual and the exothermic energy released by the polymerization is easier to dissipate, even at relatively high temperatures.

All of the above mentioned difficulties make the production of usable size (200 to 1000 micrometers) beads of polystyrene methyl methacrylate in commercial size reactors a challenge.

SUMMARY OF THE INVENTION:

The present invention relates to a range of suspensions and conditions that produce beads with from about a 50:50 to 25:75 ratio of polystyrene/methyl methacrylate. The temperature of polymerization is lower than what most commercial production of polystyrene utilizes, in order to better dissipate the higher amount of energy released by the process. The preferred temperature of polymerization is from 60 to 80° C.; a higher water to styrene ratio is used.

The ratio of water to styrene in the present invention is from about 55:45 to 70:30 parts water to styrene by weight. The suspension uses higher amounts of tricalcium phosphate (TCP) as compared with polystyrene suspensions. The useful range of TCP amounts is about 0.3 to 1.0% of TCP w/w based on water.

Although potassium persulfate can be used as a sole extender for 50:50 styrene to methyl methacrylate, increasing the amount of the methyl methacrylate calls for the use of a mixture of potassium persulfate and sodium alkyl benzene sulfonate.

Bead size can be controlled by varying the amount of TCP, extenders and agitation rate. Preferably, the extender amounts and the agitation speed are used for particle size control and most preferably the agitation speed is used to control the bead particle size.

DETAILED DISCRIPTION OF THE INVENTION

Described below are experiments that provided a robust suspension system for higher amounts of methyl methacrylate to styrene ratios.

A glass six-liter reactor was used in testing, having a domed top and bottom with a jacket on the bottom and the sides. The reactor had a diameter of 200 mm and a depth of 280 mm. The temperature was maintained by using a water bath circulating the water through the reactor jacket. The variables considered were the ratio of styrene to methyl methacrylate, temperature, level of TCP, level and types of extending agents, and rate of agitation.

It was found that at a temperature as high as 90° C., a methyl methacrylate to styrene ratio of 70:30 can cause the reaction speed to accelerate to levels where the cooling was not sufficient, even in the small reactor that had a favorable cooling area to volume ratio. This further increased the temperature and rate of reaction. The reaction temperature was then reduced to 80° C. When lower ratios of methyl methacrylate to styrene such as 50:50 were used, it was possible to effectively carry the reaction and control the temperature at 90° C.

The bead size of the product could be controlled by several factors. As can be seen from Examples 1 to 4, the reduction of TCP and potassium persulfate increased the size of the polymer beads. A further decrease of the TCP and potassium persulfate led to very unstable suspensions. Therefore, sodium alkyl benzene sulfonate was added to the suspension and other means of bead size control were used. Lowering the amount of the extender also reduced the average bead size of the polymer, as observed in Examples 5 to 7. Another factor that could control the bead size was the rate of agitation. Examples 8 to 10 depict reactions run from 1900 to 1400 RPMs, yielding average bead sizes from 191 to 565 micrometers. Using the lower agitation rate from 1400 to 1600 RPM gave rise to better bead distributions and more stable suspensions than at higher RPMs with less TCP and extenders. Therefore, the agitation rate is the most preferred tool in bead size control.

EXAMPLE 1

In a six-liter glass reactor 2700 g of deionized water and 27.1 g of tricalcium phosphate (TCP) were added. The mixture was heated to 110° F. and 690 g styrene and 1610 g methyl methacrylate were added. The mixture was heated to 160° F. and 6.62 g benzoyl peroxide (dry weight), 1.40 g of tert-amyl peroxy-2-ethyl hexyl carbonate (TAEC) and 0.0915 g potassium persulfate were added. After the mixture reached 176° F. the temperature was maintained, and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 132 microns as determined by particle size analysis (PSA).

EXAMPLE 2

In a six-liter glass reactor 2970 g of deionized water and 24.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0813 g potassium persulfate were added. After the mixture reached 176° F. the temperature was maintained and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 182 microns as determined by PSA.

EXAMPLE 3

In a six-liter glass reactor 2970 g of deionized water and 22.5 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0762 g potassium persulfate were added. After the mixture reached 176° F. the temperature was maintained and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 239 microns as determined by PSA.

EXAMPLE 4

In a six-liter glass reactor 2970 g of deionized water and 21.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0711 g potassium persulfate were added. After the mixture reached 176° F. the temperature was maintained and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 456 microns as determined by PSA.

EXAMPLE 5

In a six-liter glass reactor 2970 g of deionized water, 0.0410 g sodium alkyl benzene sulfonate and 27.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0248 g potassium persulfate were added. After the mixture reached 176° F. the temperature was maintained and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 142 microns as determined by PSA.

EXAMPLE 6

In a six-liter glass reactor 2970 g of deionized water, 0.0369 g sodium alkyl benzene sulfonate and 27.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0223 g potassium persulfate were added. After the mixture reached 176° F. the temperature was maintained and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 170 microns as determined by PSA.

EXAMPLE 7

In a six-liter glass reactor 2970 g of deionized water, 0.0332 g sodium alkyl benzene sulfonate and 27.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0201 g potassium persulfate were added. After the mixture reached 176° F. the temperature was maintained and the suspension was agitated at 3000 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 332 microns as determined by PSA.

EXAMPLE 8

In a six-liter glass reactor 2970 g of deionized water, 0.0332 g sodium alkyl benzene sulfonate and 27.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0711 g potassium persulfate were added. After the mixture reached 176° F. the temperature was maintained and the suspension was agitated at 1900 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 191 microns as determined by PSA.

EXAMPLE 9

In a six-liter glass reactor 2970 g of deionized water, 0.0332 g sodium alkyl benzene sulfonate and 27.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0711 g potassium persulfate were added. After the mixture reached 176° F. the temperature was maintained and the suspension was agitated at 1600 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 266 microns as determined by PSA.

EXAMPLE 10

In a six-liter glass reactor 2970 g of deionized water, 0.0332 g sodium alkyl benzene sulfonate and 27.0 g of TCP were added. The mixture was heated to 110° F. and 759 g styrene and 1771 g methyl methacrylate were added. The mixture was heated to 160° F. and 7.28 g benzoyl peroxide (dry weight), 1.54 g of TAEC and 0.0711 g potassium persulfate were added. After the mixture reached 176° F. the temperature was maintained and the suspension was agitated at 1400 rpm for 6.0 hours at that temperature. At the end of the polymerization cycle the reactor was cooled slowly to room temperature. The slurry was passed through a fine nylon mesh cloth to separate the beads from the water. The beads were allowed to dry overnight at 60° C. They had an average bead size of 565 microns as determined by PSA.

The above experiments allowed for the successful scale-up, as described below.

EXAMPLES

Preparation of styrene/methyl methacrylate (SMMA) Copolymer Particles

Example 1 (SMMA 30/70) @ 250 RPM

Added to a 100 gallon reactor at room temperature were 512 lb. of water and 1652 g of tricalcium phosphate (TCP). While stirring at 250 RPM, the mixture was heated to 110° F., followed by the addition of 102 lb. of styrene and 238 lb. of methyl methacrylate, along with 102 g of the initiators benzoyl peroxide (BPO), which is 75% active, and 94.2 g of tertiary amyl 2-ethylhexyl peroxycarbonate (TAEC).

The mixture was heated to 160° F., and 1.23 g of potassium persulfate and 2.03 g of Nacconol were added. After the mixture reached 170° F., the suspension was heated for 7.0 hours at 170° F.

The reactor was then heated to 238° F. and held at that temperature for 3½ hours. The reactor was cooled to 95° F. and the reaction mixture containing the copolymer beads was acidified to a pH of 1.6–2.0 in a batch out tank. The styrene/methyl methacrylate beads were dried using a Carter Day dryer and screened using a top screen (TBC 36) and a bottom screen (TBC 94).

The particle size ranged from 106 to 180 microns.

Example 2 (SMMA 30/70) @ 215 RPM

The particle size ranged from 125 to 212 microns.

Example 3 (SMMA 30/70) @ 205 RPM

The particle size ranged from 180 to 355 microns.

Preparation of Expandable polystyrene/methyl methacrylate (EPSMMA) Copolymer Particles Example 4 (EPSMMA 30/70) Containing iso-hexane Added to a 50 gallon reactor at room temperature were 370 lb. of water, 100 lb. of styrene/methyl methacrylate copolymer beads from Example 3 and 209 g of TCP, followed by the addition of 13 g of Nacconol, 70 g of Triton X-102, and 140 g of Triton X-305, while stirring at 350 RPM. Upon reaching 125° F., the reactor was purged three times with nitrogen. The iso-hexane blowing agent was added at a rate of 1.5 lb. every 5 minutes, while the temperature was raised concurrently at a rate of 8° F. every 5 minutes. A total of 10 lb. of blowing agent was added. The mixture was kept at 190° F. for one hour. The reactor was then heated from 190° F. to 220° F. at a rate of 8° F./5 minutes, and was kept at 225° F. for 3 hours.

The reactor was cooled to 95° F. and the reaction mixture containing the copolymer beads was acidified to a pH of 1.6–2.0 in a batch out tank. The expandable styrene/methyl methacrylate copolymer beads were dried using a Carter Day dryer and screened using a top screen (TBC 36) and a bottom screen (TBC 94).

The total volatiles of the beads were 8.21 wt. %. The beads were treated with 20 g of silicone oil and 100 g of zinc stearate for 3 minutes in a mixing vessel. The coated copolymer beads were preexpanded using a Vulcan Styro-logic preexpander at 0.30 bar for 70 seconds, which resulted in the formation of prepuff having a density of 2.4 pcf.

Although the invention has been described in terms of exemplary embodiments, it is not limited thereto. Rather, the appended claims should be construed broadly to include other variants and embodiments of the invention which may be made by those skilled in the art without departing from the scope and range of equivalents of the invention.

What is claimed is:

1. In the method for forming an expandable styrenic copolymer, comprising:

providing polymeric seeds in an aqueous medium;

combining with the polymeric seeds, in the aqueous medium, a suspending agent and one or more surfactants in a ratio of about 1:175 or less to the weight of suspending agent, to form a seed mixture;

providing a monomer mixture comprising from about 50 to about 90 percent by weight of one or more acrylic monomers, from about 10 to about 50 weight percent of one or more styrenic monomers, and one or more initiators;

combining the monomer mixture with one or more expanding agents to form a reaction mixture;

combining the seed mixture with about 100 to about 2500 weight percent of the reaction mixture, based on the weight of the seeds in the seed mixture, of the seed mixture to form a polymerization mixture;

and heating the polymerization mixture to a polymerization temperature to effect formation of foamed copolymer seeds, a process for preparing a pattern for use in making metal castings which have significantly less residual carbon on the surface, comprising:

(a) providing a monomer mixture comprising methyl methacrylate, one or more styrenic monomers, one or more initiators and water, (b) combining the monomer mixture with one or more expanding agents to form a reaction mixture containing copolymer beads;

(c) adding a suitable blowing agent to the monomer mixture and heating to impregnate the beads;

(d) separating the impregnated beads from the monomer mixture, washing and drying the beads; and (e) molding said beads into the pattern.

2. The method of claim 1, wherein said styrenic monomer is selected from the group consisting of styrene and alpha-methyl styrene.

3. The method of claim 1, wherein the beads have a ratio of polystryrene to methyl methacrylate of from about 50:50 to 25:75.

4. The method of claim 1, wherein the temperature of polymerization is from about 60 to 80° C.

5. The method of claim 2, wherein the ratio of water to styrene is from about 55:45 to 70:30 parts water to styrene, by weight.

* * * * *